United States Patent
Kielies et al.

(10) Patent No.: US 6,460,240 B1
(45) Date of Patent: Oct. 8, 2002

(54) METHOD OF MANUFACTURING A PROFILE MEMBER OF A HYBRID COMPOSITE MATERIAL

(75) Inventors: Andreas Kielies, Bremen; Rolf Beck, Weyhe; Guenter Doehle, Bremen, all of (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/721,169

(22) Filed: Nov. 21, 2000

(30) Foreign Application Priority Data

Nov. 24, 1999 (DE) .......................... 199 56 394

(51) Int. Cl.$^7$ .............................................. B21D 35/00
(52) U.S. Cl. ................... 29/469.5; 156/222; 156/307.7
(58) Field of Search ................... 29/469.5; 156/222, 156/307.7, 60, 182

(56) References Cited

U.S. PATENT DOCUMENTS

| | | | |
|---|---|---|---|
| 3,349,157 A | * 10/1967 | Parsons | 264/255 |
| 3,769,138 A | * 10/1973 | Robbiati | 156/310 |
| 3,878,015 A | * 4/1975 | Johnston | 156/222 |
| 3,942,231 A | * 3/1976 | Whitaker | 29/889.7 |
| 4,109,435 A | * 8/1978 | Lloyd | 52/309.1 |
| 4,211,354 A | * 7/1980 | Hoffman et al. | 228/118 |
| 4,219,980 A | * 9/1980 | Loyd | 52/309.1 |
| 4,256,790 A | * 3/1981 | Lackman et al. | 428/73 |
| 4,287,014 A | 9/1981 | Gaku et al. | |
| 4,331,495 A | * 5/1982 | Lackman et al. | 156/93 |
| 4,482,912 A | * 11/1984 | Chiba et al. | 257/746 |
| 4,504,341 A | * 3/1985 | Radzwill et al. | 156/102 |
| 4,937,125 A | * 6/1990 | Sanmartin et al. | 428/116 |
| 4,969,966 A | * 11/1990 | Norman | 156/102 |
| 5,092,952 A | * 3/1992 | Minnick et al. | 156/306.6 |
| 5,194,190 A | * 3/1993 | Kim | 264/291 |
| 5,322,580 A | * 6/1994 | McIntire et al. | 156/148 |
| 5,759,325 A | * 6/1998 | Davis | 156/154 |
| 5,876,651 A | * 3/1999 | Blackburn, Jr. et al. | 264/265 |
| 5,954,898 A | * 9/1999 | McKague et al. | 156/64 |
| 5,961,764 A | * 10/1999 | Sydow et al. | 156/242 |
| 6,261,395 B1 | * 7/2001 | Duffy | 156/64 |

FOREIGN PATENT DOCUMENTS

| | | |
|---|---|---|
| DE | 1778626 | 5/1971 |
| DE | 2952440 | 7/1980 |
| EP | 0664210 | 7/1995 |

* cited by examiner

Primary Examiner—David P. Bryant
Assistant Examiner—Essama Omgba
(74) Attorney, Agent, or Firm—W. F. Fasse; W. G. Fasse

(57) ABSTRACT

A profile member of hybrid composite materials including alternating layers of metal and fiber-reinforced composite is fabricated by three successive steps. In a first step, wet composite prepreg layers impregnated with a binder are alternately stacked with metal layers, so that the uncured binder wets the surfaces of the metal layers. Next, the initial uncured layer structure is plastically deformed using successive pressure or bending deformation steps until a prescribed cross-sectional contour of the layer structure is achieved. Finally, the formed layer structure is supported and fixed in an autoclave, in which the binder is cured under an applied mechanical pressure and elevated temperature, to form the finished profile member.

16 Claims, 1 Drawing Sheet

METHOD OF MANUFACTURING A PROFILE MEMBER OF A HYBRID COMPOSITE MATERIAL

PRIORITY CLAIM

This application is based on and claims the priority under 35 U.S.C. §119 of German Patent Application 199 56 394.2, filed on Nov. 24, 1999, the entire disclosure of which is incorporated herein by reference.

FIELD OF THE INVENTION

The invention relates to a method of manufacturing a shaped profile member of a hybrid composite material including a stack of alternating metal layers and fiber-reinforced composite layers.

BACKGROUND INFORMATION

Various methods of manufacturing profile members of a hybrid composite material including fiber-reinforced plastic composites and metals are generally known. Typically, such methods involve forming a stack of alternating layers of fiber-reinforced composite material and of metal sheets in a planar configuration and then curing or hardening the composite material layers in the flat planar configuration. After the flat planar stack of material has been cured and hardened, conventional forming processes are used to reform the flat planar hybrid stack into the desired finished, profiled or contoured configuration. The forming capabilities of such forming processes are limited in that they are able to achieve only relatively large radii of curvature by an plastic deformation of the laminated stack of hybrid materials. For that reason, the use of such methods for fabricating profile members for aircraft construction has found only limited application, and is not suitable for all possible uses or purposes in the construction of an aircraft.

Moreover, the initially flat planar laminated stack of hybrid metal and composite layers, which is then subjected to a forming process to achieve the required deformation, will exhibit a certain "spring back" deviation of the finished deformed contour back toward the original flat planar configuration. It is very difficult to predetermine and thus correct for, or to otherwise avoid, such contour deviations from the desired configuration, which result from the spring-back phenomenon. For this reason, it is extremely difficult to achieve a required finished contour with high precision using the conventional techniques.

It has further been found that the several laminated layers of the hybrid stack suffer undesired delamination as a result of the deformation process. Thus, the deformation process must be strictly limited, monitored, and controlled, or else such delamination will readily occur.

In another conventional method, it is known to individually preform individual metal sheets using known forming processes, so as to fabricate appropriately shaped individual metal layers having correspondingly formed cross-sections, to be used in the subsequent layering or stacking to form a finished profile member. Namely, once all of the individual metal layers have been formed as needed, they are then stacked and laminated together by the adhesive bonding provided by the binder material as it is cured and hardened, in order to obtain the finished profile member construction in the pre-formed configuration. In such a method, each individual layer requires its own individualized contour. Namely, to avoid layer thickness variations, different curvature developments and forming characteristics of the several individual layers must be taken into account. This leads to rather high tooling costs, fabrication effort, and fabrication costs. Also, such a method is only able to achieve contoured profiles having relatively large radii of curvature, similarly to the above described method.

SUMMARY OF THE INVENTION

In view of the above, it is an object of the invention to provide a method of fabricating a profile member of a hybrid composite material including metal layers and at least one fiber-reinforced composite layer, whereby the finished profile member can be fabricated in substantially any desired form, contour or configuration, without being limited to relatively large radii of curvature. It is a further object of the invention to provide such a member, whereby the forming process results directly in a substantially finished profile member, without requiring any after-machining or post-processing such as complex and costly straightening, bending or orienting of the fabricated profile member. The invention further aims to avoid or overcome the disadvantages of the prior art, and to achieve additional advantages, as apparent from the present specification.

The above objects have been achieved according to the invention in a method of manufacturing a profile member of a hybrid composite material including metal layers and at least one fiber-reinforced composite layer.

In a first step of the method, the individual metal and fiber-reinforced composite layers are alternately stacked, while the composite layers are still wet with a thermally curable resin or other binder, so that this binder wets and adheres to the surfaces of the metal layers, so as to form thereof an uncured initial layer structure. Preferably, each composite layer is a prepreg of a fiber-reinforced composite material such as a carbon fiber composite, a graphite fiber composite, a glass fiber composite, or an aramid fiber composite, which is impregnated with a suitable curable binder. Preferably, the laminated stack of metal and composite layers is formed in the first step to have a flat planar configuration. In other words, all of the layers respectively extend along flat planes parallel to each other.

In a second step of the method, the laminated stack, i.e. the initial uncured layer structure, is plastically deformed in successive deforming steps by means of pressure or bending deformation to the required extent until the initial laminated stack has its cross-section deformed into a predefined profile shape or prescribed cross-sectional contour that differs from the initial cross-sectional contour of the initial layer structure. With this invention radii from 2 mm–10 mm are feasible.

In a third step of the inventive method, the formed laminated stack or deformed layer structure, which has been deformed into the predefined profile shape in the preceding step, is then placed and positioned in an autoclave and subjected to pressure and heat in order to cure and harden the binder of the composite material layers. Thereby, the finished profile member having the finished profile shape is achieved.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
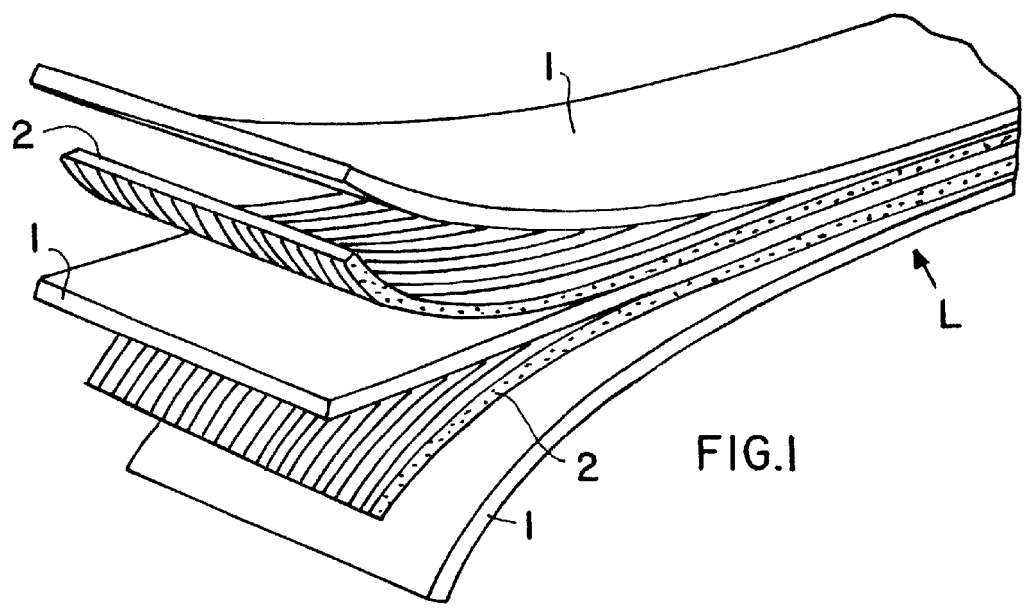
FIG. 1 is a partially exploded or delaminated perspective view of an initial layer structure formed of plural, alternating metal strips and composite prepreg strips.

The initial layer structure L shown in FIG. 1 comprises plural precut blanks in the form of metal strips 1 and composite prepreg strips 2, which are alternately stacked, one on another, to essentially any desired number to form the layer structure L having the required thickness and other characteristics. Each of the precut blanks has been prepared in prior processing steps, for example cleaning the metal material, pre-impregnating the fiber-reinforced composite material, and cutting the respective materials into the required dimensions of an elongated strip shape. The metal strips 1 can be fabricated from any appropriate metal material, such as sheet metal of aluminum alloys or titanium alloys, as appropriate for the desired end utilization. The prepreg strips 2 are fabricated from a fiber-reinforced composite material including reinforcing fibers, such as carbon fibers, graphite fibers, glass fibers, aramid fibers or other fibers impregnated with a suitable resin or other thermally curable binder.

The inventive method for fabricating a profile member of a hybrid composite material begins with forming an initial layer structure L as described above in connection with FIG. 1. The layer structure includes a suitable number of layers of metal 1 and binder-wetted composite prepreg 2 stacked or laminated one on top of another to build up the desired thickness or strength or the like of the finished profile member. The metal strips 1 and the composite prepreg strips 2 are laid-up or otherwise arranged one on top of another in a flat planar configuration in which the respective strips are uniformly oriented. The layers may be laid-up without pressing, or may be loosely pressed to adhere the layers closely to each other, without tightly fixing the layers to each other. In this condition, the thermally curable binder of the composite prepreg strips 2 is in a liquid or tacky uncured state and wets and adheres to the surfaces of the respective metal strips 1. The term "uncured" herein refers to a condition in which the binder is still wet or tacky and not fully cured, but possibly already partially cured.

In the particular embodiment shown in FIG. 1, the layer structure L includes a central metal strip 1, two prepreg strips 2 respectively surfacially laminated onto the top surface and bottom surface of the central metal strip 1, and two outer metal strips respectively laminated onto the composite prepreg strips 2, so as to form a laminated sandwich with upper and lower metal strips 1 forming the upper and lower external surfaces of the layer structure L, and with alternating composite prepreg strips 2 and a metal strip 1 sandwiched therebetween.

Once the initial layer structure L has been formed in the first step as described above, this uncured layer structure L is then subjected to a succession of deforming steps, preferably using a plastic deformation apparatus. The successive plastic deforming steps are carried out until a predefined profile shape or prescribed cross-sectional contour of the deformed layer structure is achieved. While the plastic deformation apparatus is not shown, any conventional deforming machine can be used, by means of which the initial layer structure L in the form of a single packet can be plastically deformed in a single working cycle or a succession of deforming steps carrying out bending, edging, roll forming, pressing, or other conventionally known plastic deformation processes. During the deforming, the individual layers or strips of the layer structure L are still relatively loosely lying one on top of another, i.e. are not fixedly laminated to one another, but are overall in a closed condition with the successive strips or layers closely in contact with one another. For this reason, the respective strips 1 and 2 are able to shift or slide laterally relative to one another as needed during the deforming steps, in order to accommodate the deformation without undue stress or strain being applied to the several layers.

The deforming step or steps serve to form a hook-shaped bend and a right-angled bend having relatively small radii of curvature in the layer structure L, in the present example embodiment. Thus, the cross-section of the layer structure L has been deformed into a profile shape, for example generally similar to that of the finished product shown in FIG. 2.

Thereafter, in a third step in the inventive method, the formed layer structure is positioned in an autoclave and subjected to mechanical pressure and an increased temperature sufficient for curing the binder of the composite prepreg strips 2. During this autoclaving step, appropriate supports and fixing jigs are used to support and hold the formed layer structure, because the individual metal strips 1 and composite prepreg strips 2 in the formed layer structure are initially still flexible and loosely laminated in the prescribed stacked sequence. The supports and fixing jigs thus ensure that the finished profile member will have a predetermined cured shape or configuration and position, by providing a suitable calibration of the formed layer structure during the curing process. This excludes the possibility of contour deviations during the curing process from the desired shape or configuration that was established by the preceding deformation step. Such contour deviations and undesired deformations that might otherwise arise include warping, twisting, angular deviations, sword-like curvatures of profile members intended to be straight, and the like.

Depending on the particular hybrid materials being used, the curing process of the layer structure in the autoclave is carried out at a temperature in the range from 120 to 180° C. (and especially between 120 and 180° C.), a holding time from 60 to 120 minutes (and especially between 60 and 120 minutes), and an applied pressure from 2 to 10 bar.

Figure 2:
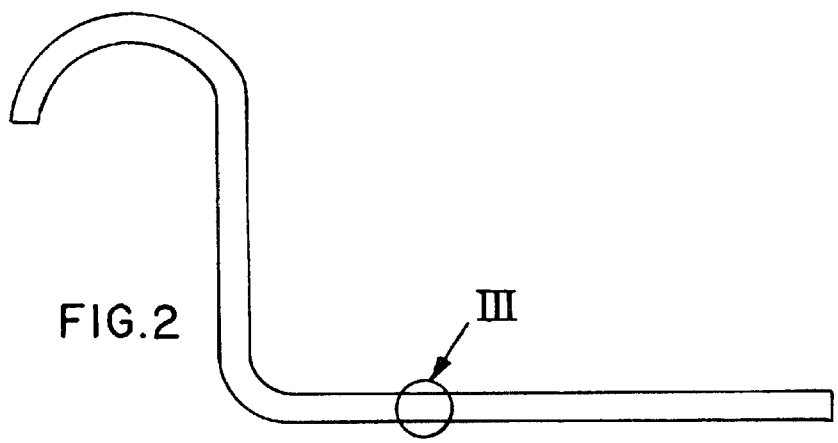
FIG. 2 is a schematic end view of a profile member that has been formed from the initial layer structure of FIG. 1 to have a prescribed cross-sectional contour.
Figure 3:
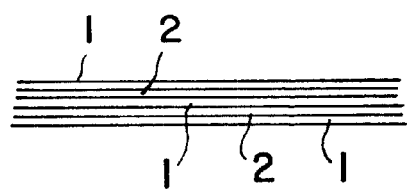
FIG. 3 shows an enlarged view of the detail portion III of FIG. 2.

FIG. 2 shows a final, finished profile member that is completely cured as a result of the above stacking, deforming, and curing steps. The particular profile member shown in FIG. 2, as an example, is a stringer profile member having a suitable cross-sectional shape and suitable properties for use as a stringer in the manufacture of an aircraft fuselage. The particular desired cross-sectional shape as shown in FIG. 2 was achieved as described above in a package-forming process by bending, rolling, or pressing, etc.

The present inventive method most simply involves laying-up wet prepreg strips alternately with metal strips in a flat planar stack, then deforming the uncured layer structure into a contoured profile configuration, and thereafter curing the binder of the composite prepreg strips so as to stiffen and harden the resulting profile member in the desired contoured shape and firmly adhesively bond together the several layers. As such, the inventive method is very simple and economical to carry out, and is able to fabricate profile members of hybrid materials having profile contours with relatively small radii of curvature. Another important advantage is that no post-processing or after-machining of the profile members, such as straightening of the profile members, is necessary. Namely, the profile member resulting from the curing step is a finished profile member that is ready to be cut to length, and used in a further manufacturing assembly operation, such as the manufacturing of an aircraft fuselage.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of making a profile member of a hybrid composite material including metal layers and fiber-reinforced composite layers, comprising the following steps:

a) alternately stacking metal layers and fiber-reinforced composite prepreg layers, which are impregnated with an uncured thermally curable binder, one on another so that said uncured binder wets respective surfaces of said metal layers, so as to prepare thereof an uncured initial layer structure having an initial cross-sectional contour;

b) plastically deforming said uncured initial layer structure to prepare thereof a deformed layer structure having a prescribed cross-sectional contour different from said initial cross-sectional contour; and c) curing said binder of said deformed layer structure under an elevated temperature and an elevated pressure in an autoclave, so as to cure and harden said deformed layer structure and prepare thereof a finished profile member.

2. The method according to claim 1, wherein said step a) is carried out so that each of said layers has a flat planar configuration and said initial cross-sectional contour is a flat planar cross-sectional contour.

3. The method according to claim 2, wherein said step b) is carried out so that said prescribed cross-sectional contour includes at least one of a curved contour section, an angled contour section and a bent contour section.

4. The method according to claim 1, wherein said deforming in said step b) comprises carrying out plural successive plastic deformation steps.

5. The method according to claim 1, wherein said deforming in said step b) comprises at least one of compression deforming and bending deforming.

6. The method according to claim 1, further comprising a preliminary step of providing layers of at least one prepreg composite material selected from carbon fiber composites, graphite fiber composites, glass fiber composites and aramid fiber composites as said prepreg layers.

7. The method according to claim 1, wherein said step a) is carried out so that said uncured initial layer structure has two outermost ones of said metal layers forming two opposite exterior metal surfaces of said initial layer structure.

8. The method according to claim 1, wherein said step c) further comprises supporting and fixing said deformed layer structure during said curing to ensure that said finished profile member has a pre-selected finished cross-sectional contour.

9. The method according to claim 8, wherein said finished cross-sectional contour is different from said prescribed cross-sectional contour.

10. The method according to claim 1, further comprising a preliminary step of providing precut metal blanks having an elongated strip shape as said metal layers, and providing precut composite prepreg blanks having an elongated strip shape as said prepreg layers.

11. The method according to claim 1, wherein said deforming in said step b) comprises at least one of curve-bending, edge-bending, roll forming, penetration, and pressing.

12. The method according to claim 1, wherein said elevated temperature is in a range from 120° C. to 180° C., said elevated pressure is in a range from 2 bar to 10 bar, and said elevated temperature and said elevated pressure are maintained during a holding time in a range from 60 minutes to 120 minutes.

13. The method according to claim 1, wherein said uncured initial layer structure includes at least three of said metal layers and at least two of said prepreg layers arranged in alternate succession.

14. The method according to claim 1, wherein said layers are not fixedly secured to one another in said steps a) and b), so that said layers can shift laterally relative to one another during said deforming in said step b).

15. The method according to claim 1, expressly excluding all further deforming of said finished profile member after completion of said step c).

16. The method according to claim 3, wherein said prescribed cross-sectional contour has at least a portion with a radius of curvature in a range from 2 mm to 10 mm.

* * * * *